July 13, 1943.  S. GOLTEN  2,324,206
STUFFING BOX SEALING DEVICE
Filed Nov. 30, 1940
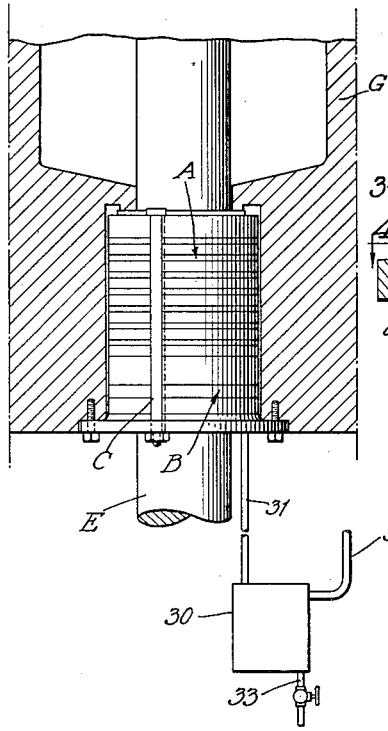
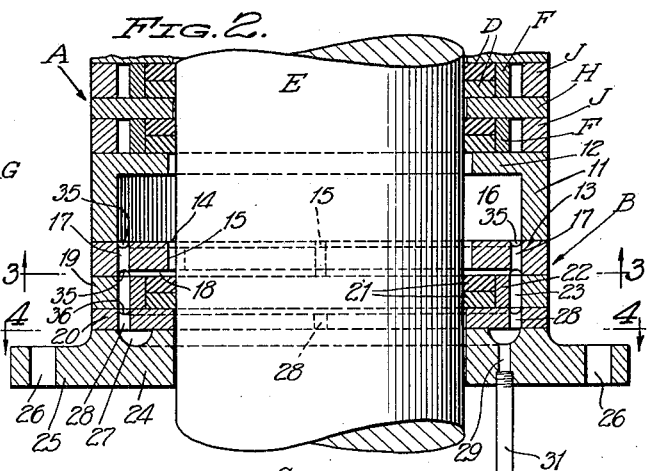
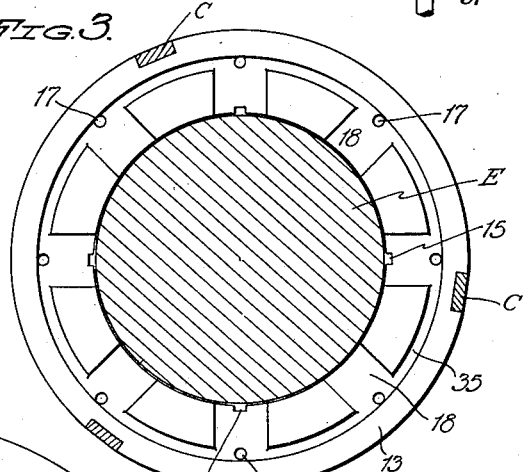
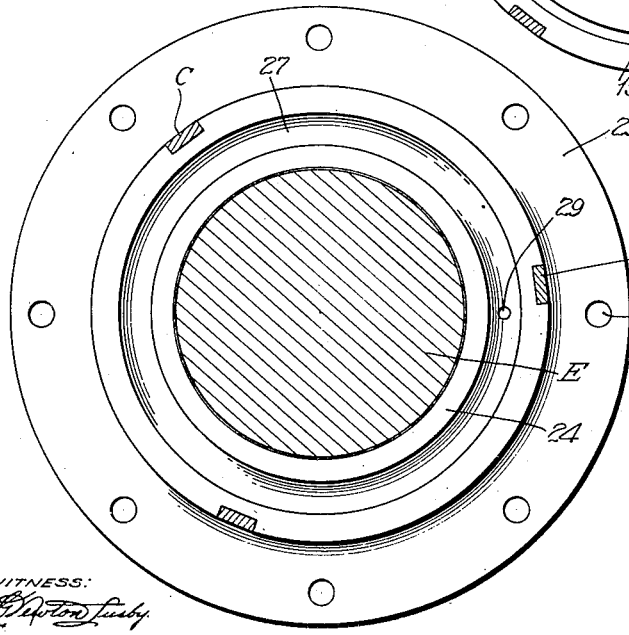
SIGURD GOLTEN.
INVENTOR
BY
ATTORNEYS Patented July 13, 1943

2,324,206

UNITED STATES PATENT OFFICE 2,324,206

STUFFING BOX SEALING DEVICE

Sigurd Golten, New York, N. Y.

Application November 30, 1940, Serial No. 367,872
In Norway January 1940

3 Claims. (Cl. 286—27)

This invention relates to improvements in stuffing boxes and more specifically to leak-proof stuffing boxes for use in connection with double-acting motors.

Stuffing boxes of the kind generally used on double acting motors for marine use and with which I am familiar are faulty, in that leakage of gases and dirty oil from the cylinder of the motor occurs when the piston rod becomes worn, or when the stuffing box is leaky. The escaping mixture of exhaust gases and vaporized oil fumes is objectionable and dangerous, for it fouls the air of the engine room which is detrimental to the health of the engine crew, and further, a deposit of oil occurs on all surfaces and objects present in the engine room resulting in frequent cleaning of the engine room, which makes additional work for the crew.

It is therefore the object of this invention to eliminate the above mentioned conditions by constructing a stuffing box which is leak-proof, simple of construction, inexpensive of manufacture, and easy to install upon double-acting motors now in use.

Another feature of the invention resides in a leak-proof stuffing box in which any gases or oil which may escape from the cylinder of the motor about the joint between the piston rod and the stuffing box are trapped and eventually pass to a condenser where they collect for reuse.

Other features of the invention will become apparent as the following specification is read in conjunction with the accompanying drawing, in which:

Figure 1 is a sectional view through a portion of a motor cylinder illustrating the improved stuffing box in side elevation.

Figure 2 is an enlarged vertical sectional view of the lower portion of the stuffing box.

Figure 3 is a horizontal sectional view on the line 3—3 of Figure 2, looking in the direction of the arrows.

Figure 4 is a horizontal sectional view on the line 4—4 of Figure 2, looking in the direction of the arrows.

Referring to the drawing by reference characters, the numeral 10 designates my improved leak-proof stuffing box in its entirety which includes a stuffing box section A and a sealing device section B, the same being held together by bolts C. The stuffing box section A is the conventional stuffing box construction, and is made up of a plurality of axially alined metal segmental sealing rings D held in sealing engagement with the piston rod E of the piston of a double acting motor by a split compression ring F, a portion of the motor cylinder being designated G. The set of sealing rings D and their related compression ring F are separated from the next adjacent set of sealing rings by spacer rings H and the rings are maintained in spaced relation by the collars J. The stuffing box section above described is of conventional construction and in practice, it is supposed to seal the joint between the piston rod E and the motor cylinder. However, when the piston rod becomes worn or a fault occurs in the stuffing box, leakage of gases and oil occurs, and it is such leakage which the sealing device B is adapted to correct.

The sealing device B includes a collar 11 having an inwardly extending annular flange 12 against which the outer set of sealing rings D, compression ring F, and collar J abut. The inner peripheral wall of the flange 12 is spaced from the piston rod E. Abutting the outer side of the collar 11 is a plate disk 13 having a central opening 14 for the passage of the piston rod, the annular wall of the opening 14 being provided with spaced apart passages 15 which extend parallel to the axis of the disk plate. The collar 11 and disk plate 13 coact to define an expansion chamber 16 for the reception of any oil or gases which may leak through the stuffing box section A. The disk plate 13 is also provided with equidistantly spaced passages 17 which open through the outer face of the disk plate 13 into radially arranged passages 18 which extend outwardly from the annular wall of the opening 14 as best illustrated in Figure 3. The passages 17 open into annular grooves 35—35 provided in the opposed faces of the disk plate 13.

Fitting against the outer face of the disk plate 13 is a spacer collar 19 which maintains the disk plate in spaced relation to a disk plate 20. Disposed within the space between the disk plates 13 and 20 is a pair of abutting metal segmental sealing rings 21—21 which are held in sealing engagement with the piston rod E by a split metal resilient compression ring 22, the same being disposed in spaced relation to the inner peripheral wall of the collar 19 to provide an annular passage 23.

Fitting against the outer side of the disk plate 20 is an outer end disk plate 24 having an annular flange 25 provided with spaced apart openings 26 through which fastening bolts 34 pass for securing the stuffing box unit 10 in position within the bearing of the motor cylinder G. The inner side of the disk plate 24 is provided with an annular collecting groove or trough 27 which communicates with the passage 23 through spaced apart passages 28 provided in the disk plate 20. The passages 28 open into an annular groove 36 provided on the inner face of the disk plate 20. A single drain opening 29 is provided in the end plate 24 which opens into the groove 27. The drain opening 29 is connected to a condenser 30 by a pipe 31. A suction line 32 is led from the top of the condenser and a drain pipe 33 leads from the bottom thereof.

In practice assume that the stuffing box section A becomes leaky due to a defect therein or by reason of wear of the piston rod E. Any oil or hot gases which may find their way outwardly past the sealing rings D will enter the expansion chamber 16. After the escaped gases have expanded in the chamber 16, such gases and any oil which may also have escaped and entered the chamber, are drawn therefrom by suction of the suction air line 32, or may flow through the passages 15 and 17 in the disk plate 13, annular passages 23, and passages 28 in the disk plate 20 to the annular collecting groove 27, from where they pass to the condenser 30. Any gases or oil passing through the passages 15 flows outwardly through the radial passages 18. The sealing rings 21—21 may scrape accumulated oil from the piston rod during the outward stroke of the same and any such oil will flow to the annular passage 23 through the radial passages 18. Any oil which is trapped in the condenser 33 may be drained therefrom through the drain pipe 33 for reuse.

In instances where the stuffing box section A and the piston rod E are new, the collar 11 cooperating to define an expansion chamber may be dispensed with and the same applied at such time when the piston rod becomes worn or the sealing rings D become unduly faulty.

While I have shown and described what I consider to be the most practical embodiment of my invention, I wish it to be understood that such changes in construction and design as come within the scope of the appended claims may be resorted to if desired.

Having thus described the invention, what I claim as new and desire to secure by Letters Patent of the United States, is:

1. A sealing device attachment for attachment to the lower end of a stuffing box comprising an end ring plate having an annular collecting groove on the inner face thereof and a drain opening leading from said groove, a disk plate fitting against the inner side of the end ring plate having spaced openings communicating with said groove, compression rings fitting against the disk plate, a second disk plate fitting against the other side of the compression rings, said ring plate and disk plates having concentric openings therein for the passage of a piston rod, a spacer collar spaced from and surrounding the compression rings and interposed between said disk plates, the space between said disk plates, the space between said collar and the compression rings constituting an annular passage, the second mentioned disk plate having radial passages in the underside thereof extending outwardly from its inner periphery to the annular passage and spaced passages extending therethrough in communication with the radial passages and the annular passage whereby said passages establish communication between the collecting groove and the inner side of the compression rings substantially as and for the purpose specified.

2. A sealing device attachment as set forth in claim 1, including a collar fitting against the second mentioned disk plate, and an inwardly extending annular flange on the inner end of said collar, said collar and flange cooperating with the adjacent disk plate to define a gas expansion chamber.

3. A sealing device for attachment to the lower end of a stuffing box comprising in combination, a bottom ring plate having an annular oil collecting groove in the upper face thereof and a drain opening leading from said groove, a lower disk plate fitting against the upper side of the ring plate, compression rings fitting against the lower disk plate, an upper disk plate fitting against the compression rings, an expansion chamber forming member having an annular side wall and an inwardly extending flange at the top thereof, the lower end of said side wall fitting against the upper side of the upper disk plate, the space between the upper disk plate and flange defining a gas expansion chamber, said lower and upper disk plate having concentric openings therein for the free passage of a piston rod, and oil and gas passages provided in said disk plates in open communication with the expansion chamber and the collecting groove.

SIGURD GOLTEN.